(12) United States Patent
Sun

(10) Patent No.: US 7,882,186 B1
(45) Date of Patent: Feb. 1, 2011

(54) SELECTABLE EMAIL SIGNATURES

(76) Inventor: Chen Sun, 5900 Ranchester Dr. #706, Houston, TX (US) 77036

( * ) Notice: Subject to any disclaimer, the term of this patent is extended or adjusted under 35 U.S.C. 154(b) by 478 days.

(21) Appl. No.: 11/546,740

(22) Filed: Oct. 12, 2006

Related U.S. Application Data

(60) Provisional application No. 60/726,358, filed on Oct. 13, 2005.

(51) Int. Cl.
*G06F 15/16* (2006.01)
*G06F 3/00* (2006.01)

(52) U.S. Cl. .................. 709/206; 709/203; 709/207; 709/246; 715/700

(58) Field of Classification Search ............... 709/206
See application file for complete search history.

(56) References Cited

U.S. PATENT DOCUMENTS

| | | | |
|---|---|---|---|
| 6,487,600 B1 * | 11/2002 | Lynch | 709/229 |
| 7,464,408 B1 * | 12/2008 | Shah et al. | 726/22 |
| 2001/0032240 A1 * | 10/2001 | Malone et al. | 709/203 |
| 2002/0019849 A1 * | 2/2002 | Tuvey et al. | 709/206 |
| 2002/0040387 A1 * | 4/2002 | Lessa et al. | 709/206 |
| 2003/0229717 A1 * | 12/2003 | Teague | 709/246 |
| 2004/0236666 A1 * | 11/2004 | Clark et al. | 705/37 |
| 2005/0210108 A1 * | 9/2005 | Covert et al. | 709/206 |

OTHER PUBLICATIONS

Confimax.com web page on archive.org, dated Dec. 8, 2002.*
Drexel University ListServ Manager's Survival Guide web page on archive.org, dated Feb. 20, 2003.*
Web publication from Confimax.com, recorded on www.archive.org dated Apr. 7, 2004.*

* cited by examiner

*Primary Examiner*—Ashok B Patel
*Assistant Examiner*—Linglan Edwards
(74) *Attorney, Agent, or Firm*—Osha • Liang LLP

(57) ABSTRACT

A method for modifying email signatures in emails by enabling the sender to use a numeric code appended behind the top level domain name of the intended email address portion of a readdressed email address. This readdressed address is received by an email server that inserts a numeric code-selected signature and forwards the email to the intended email address.

30 Claims, 10 Drawing Sheets

Prior Art of One-to-One Branded Emails

Signature added email

Signature added email w senders'
email addresses database

Distributive signatures requiring supporters' download and installation into their email's signature function.

Selectable signature based on numeric code in email address

Selectable signatures'
BrandingRelayServer
with multiple email
senders addresses Email readdresser Email readdresser with numeric selection code Distributive signatures using readdressed email addresses without requiring any downloads

SELECTABLE EMAIL SIGNATURES

CROSS-REFERENCE TO RELATED APPLICATIONS

This application claims the benefit of U.S. Provisional Application Ser. No. 60/726,368 filed on Oct. 13, 2005.

TECHNICAL FIELD OF INVENTION

This invention relates to a field of Internet email called one-to-one branded emails.

FEDERALLY SPONSORED RESEARCH

Not applicable

SEQUENCE LISTING OR PROGRAM

Not applicable

INCORPORATION BY REFERENCE

Background

This invention is in the email field of individually redirected and tracked emails, called one-to-one branded emails or one-to-one tracked emails. "One-to-one branded emails" is how this patent shall refer this field.

TERMINOLOGY

Some terminology definitions will help:
1. Intended email address. This is the email address of the recipient. For example, Person@ABC.com.
2. Represented intended email address is the part of the readdressed email address that usually shows a slightly modified intended email address. For example, "Person=ABC.com" is the represented intended email address for Person=ABC.com@BrandingRelayServer.com. Another example, "Person@ABC.com" is the represented intended email address for Person@ABC.com.BrandingRelayServer.com. Occasionally the term "intended email address" will mean "represented intended email address", and this can be determined from the context.
3. Readdresser is a programming routine on a email client that automates the readdressing of the intended recipient email address. For example, a Microsoft Outlook plug-in add-on programming routine that changes a prior-to-send email address of Person@ABC.com in the Outlook's recipient email address field to Person=ABC.com@BrandingRelayServer.com.
4. Readdressed email address is the recipient readdressed address, the Person=ABC.com@BrandingRelayServer.com. Another popular readdressed syntax is Person@ABC.com.BrandingRelayServer.com. Person@ABC.com is the intended email address.
5. Branding relay server is the email and relay server that receives the readdressed email address's email, resets its recipient's email address to the intended email address, and sends the email to the intended email address. The branding relay server also can add HTML code and download graphics to the emails, can create and add cookies, and can add coded web beacons. Branding relay server are frequently hosted on a Linux operating system computer. "BrandingRelayServer.com" is a representative branding relay server in this patent.
6. Web beacon—the programming code embedded with an email that can download a coded graphics from a web server. When this graphics downloads, the web server hosting the coded graphics would report that the web beacon has been opened. Web beacons are such termed because they are typically very small (10 pixels by 10 pixels or less) and use download graphics colors that are difficult for the recipient to see. Download graphics that are large and easily visible can also act as web beacons.
7. HTML email signature—HTML code added to emails that HTML-enabled email clients can display as graphics. Can include download graphics. When used in this patent application, the term HTML email signature includes web beacons because web beacons are small coded HTML signatures. Also, HTML email signature usage here also includes"email stationery", which is also HTML added to a email message, more frequently as background graphics to be displayed by the email client.
8. Distributive signature—HTML programming code provided by a sponsor such that its supporters can add this HTML code to their email clients' signature function to send out HTML signatured endorsement message to the supporters' email recipients.
9. In the representative email syntax, "ABC.com" is a representative domain name. "Person" is a representative person name. ".com" is a representative top level domain name.

Prior Arts of Branding Relay Server

In the prior arts, a branding relay server receives a SMTP email. This email has 2 parts, headers and the message. The recipient's email address can be detected in the SMTP protocol and usually in the email message header. These are standard actions of SMTP protocol emails.

FIG. 1 shows the prior technology in this the one-to-one branded email field. An email client, for example Microsoft Outlook (2) running on Windows XP on an Intel-chip personal computer (4), would contain a programming routine, the readdresser (6), that would readdress an intended email address (8) in the recipient email address field of a pending outbound email to a readdressed email address going to a special mail server, the branding relay server (10). For example, if Person@ABC.com (8) is the intended email address, the readdressed email address would be Person=ABC.com@BrandingRelayServer.com (12). Upon receiving this readdressed email, the branding relay server would parse and modify the readdressed email address (12) for the intended email address (8), reset the recipient address to the intended email address (8), add a web-beaconed HTML signature (14 and 16), possibly create a cookie (18) process, and forward the email to the intended email address. When the recipient opens his email, he sees a colorful email signature that accompanies the sender's email message.

The prior-art branding relay server typically uses Linux Operating system server using residing on a microcomputer. It is connected to the Internet and runs SMTP protocol. It can also use other operating systems that can host SMTP, for example Microsoft Windows XP. And it can incorporate various prior-art email servers, such as Sendmail or QMail. The prior-art email client communicates outbound email using SMTP that can be hosted on a personal computer, desktop workstation, other types of Internet-email capable computers.

Some examples of email clients include Microsoft Outlook, Eudora, Pine, and Yahoo! Mail.

There are syntax variations for the prior arts email readdressing. Atlantis Technologies (Maynard Mass.) uses the format Person=ABC.com@BrandingRelayServer.com (where BrandingRelayServer.com can be ClientPoint.com, Pathwise.com, or Confimax.com). Readnotify (Copacabana, Australia) uses Person@ABC.com.BrandingRelayServer.com (where BrandingRelayServer.com is Readnotify.com). In these, the information for intended email address (Person@ABC.com) is retained in the readdressed email address. Also, the intended email address information can also be included in the email headers.

FIG. 2 shows one prior art method of adding a signature on a BrandingRelayServer. The readdressed email is received by a SMTP email server (2), the email message is extracted by SMTP by a script on the server (4), the recipient email address reset to its intended email address (6), a HTML signature is inserted (8), and forward to the intended email address (10). For example, emailmsg1 to Person=ABC.com@BrandingMailServer.com could be received by the mail server and placed at directory . . . /brandingmailserver/abc/person. A script can read this email message using STMP commands and identity its message end. Another script then inserts a HTML signature near its end, at an insertion point appropriate for an aesthetically pleasing HTML signatures. Then, using information of its readdressed email address information embedded in the email headers, the BrandingRelayServer would extract information for the intended email address, recreate the intended email address (through using the known syntax of the readdressed email address), and set it as the recipient email address. The BrandingRelayServer, which can use another script and features of a SMTP email software, would then send the email to the intended email address.

As the BrandingRelayServer is a computing server, it can take different methods to add the signature. For example, the SMTP protocol also identifies the recipient, so the process may be a script that occurs without reading the email headers. Also, a SMTP server software may have a function that enables text to be appended to the received email, in which case the HTML signature can be added using the function.

FIG. 3 shows how the prior-art Readnotify type of BrandingRelayServer likely changes signatures. The user of Readnotify-type service receives a web form (2) for him to select which signature he prefers as the default. This selection is set as the default signature in BrandingRelayServer's signature database (4). When the readdressed email is received, BrandingRelayServer changes the recipient email address to the intended email address, retrieves the default HTML signature, and inserts this signature. When the recipient opens the email, he will see the colorful HTML signature, provided that he has a email client that displays HTML (8). To change a signature, the user will reenter the web form, and select another default signature. He cannot change the signature at the email client, as this invention can.

FIG. 4 further shows a prior-art Readnotify type of subscription-based BrandingRelayServer. A subscriber of Readnotify-type service receives a web form (2) for him to indicate which signature he prefers and inputs what is his sending email address (6). The user selection and sender's email address are entered into online databases (4 and 8) at the BrandingRelayServer's host. When the user-sender's email is received by Readnotify-type's BrandingRelayServer, BrandingRelayServer then detects email's sender address through SMTP protocols or through the message headers. The sender's email address is then tied into the databases (4 & 8) of sender addresses-HTML signatures, the end of the email message is detected, and his associated HTML signature programming code is added (10). The email is then readdressed to the intended email address and sent. When the recipient opens the email, he will see the colorful HTML signature, provided that he has a email client that displays HTML.

If, for example, the BrandingRelayServer happens to have a Sendmail software (of Sendmail Inc., Emeryville, Calif.) for receiving emails, here would be an example of its actions. The Sendmail receives message1 for email address Person=ABC.com@BrandingMailServer.com from Sender@DEF.com. Sendmail would add a email transaction code for message1. A server script can then use SMTP commands to receive email for Person=ABC.com@BrandingMailServer.com. The server script would then read the message header, and detect the sender's email address as well as detect the recipient email address (Person=ABC.com@BrandingMailServer.com), which is a readdressed email address. The server script would then parse the recipient email address and create the intended email address, which can be determined by the syntax of this readdressed email address. In this case, the intended email address is Person@ABC.com and sender is Sender@DEF.com. The script would then call on the stored database of sender's email addresses (8) and selected HTML signatures (4) to retrieve the appropriate HTML signature, detect the end of message1, and insert the HTML signature at a pre-selected location from the end of the message.

The now HTML signatured email message1 is then forwarded using the intended email address. The recipient would receive a signatured email, open it, and see a HTML signature associated with the email message. If the HTML signature contains a download graphics, the download graphics can be downloaded, and the download web server would record the download and the email's opening. A tracking cookie can also be downloaded.

The above is one method that Sendmail on a Linux server can be used. As there are numerous email softwares and operating systems, these can act in many different methods. QMail, another popular Internet SMTP software is also used by prior arts branded email servers for comparable actions. Those in the arts of email server softwares and one-to-one branded email software development would know the prior arts methods to accomplish these.

Prior Arts Email Client Readdresser

As mentioned above, the readdresser is located on the email client. The readdresser is a programming routine that accepts an intended email address in a pending email's recipient email field and automatically readdresses it to a syntax ready to send to the Branding Relay Server. FIG. 8 shows such a readdresser. When the sender clicks the email client readdresser button (2), the readdresser process (4) takes the content of the recipient email address field and rewrites it to a specified syntax to be emailed to the Branding Relay Server.

Prior-art readdressers were frequently Microsoft Outlook readdressers. These were typically activated by a click button on Outlook. For example, if the current Outlook recipient's email address box contains Person@ABC.com, upon clicking the button, the readdress process changes the address to Person=ABC.com@BrandingRelayServer.com. The Readnotify type readdressed syntax is Person@ABC.com.BandingRelayServer.com.

The email clients have numerous methods of adding a readdresser. For example, Microsoft Outlook allow such readdressers to be programmed using Visual Basic for Applications and VBScript. Such programming methods for creating buttons and modifying the recipient email field are well known to those in the arts of one-to-one branded emails and to those in email-client programming. Whether it is done by readdresser or by typing in the readdress itself, the readdressed email is then sent to the BrandingRelayServer.

Prior Art Distributive Email Signatures

Chen Sun had created a method where supporters downloaded a sponsor's HTML signatures and used these in the regular email correspondence. He called this process distributive email signatures. FIG. 5 shows a prior art distributive signature.

Distributive email signatures are particularly useful in political campaigns, because the supporter is sending an endorsement signature to his peers. Such a "sponsor-distributive email signature" is compatible to the ideals of American democracy—whereby a peer is making political endorsement to his peers.

It has been numerously proven in political science studies that peer endorsements is generally the most influential method in political campaigning. But, individual peer influence requires extensive time. Bulk email from the candidate's campaign to email-subscribed supporters may reinforce votes, but how does a candidate reach those who don't support? Particularly, non-supporters are unlikely to provide candidate with email addresses and are likely to regard not-supported candidates' bulk mail as spam. Without the email addresses and without being able to ethically send, how does a candidate email-persuade non-supporters?

Prior art distributive email signatures allow this, as FIG. 5 shows. A candidate first provides endorsement email signatures for download from his website (2). Supporters would download these (4), install on their email signature functions (6), and when individually sending regular emails to their peers (8), who may not be candidate's supporters, the supporter can append the signature.

When the non-supporter recipient reads the peer email message (10), the recipient will also notice the candidate's signature, and if he's interested in the signature's message, can click link to the candidate's website to find out more information.

Distributive signature is a great advance in democratic process, because it facilitates the ideals of democracy, which are peer endorsement and peer discussions. Distributive signatures allow for peer endorsements, an email method to reach non-supporters and non-email-subscribed supporters, and linkages for these to find out more information, all through using peer-sent regular email correspondence.

OBJECTS AND ADVANTAGES

Several objects and advantages of the present invention are:
  to enable senders to easily change HTML and text signatures and stationery, web beacons, and cookies processes easily by adding a numeric code to the recipients' readdressed email address,
  to facilitate use of colorful HTML emails, by sending HTML signatures through an email readdress rather than through editing HTML on the email client,
  to enable sponsors to provide to supporters an easy-to-change endorsement email signature, without supporters having to install any programming code,
  to facilitate users' using numeric-coded readdresses by providing on an email client a click button that generates a readdressed email address with a numeric code for changing signatures Further objects and advantages of my inventions will become apparent from a consideration of the drawings and ensuing description.

SUMMARY

FIG. 6 shows an overview of this invention's. It comprises of the following, which will be explained later:
  A method of readdressing a pending email's recipient field's content to one containing a numeric code and addressed to a branding relay server's domain name.
  A branding relay server that receives the readdressed email, resets its send-to (recipient) address to the initial intended email address, adds a signature based on the numeric code in the readdressed email address, and sends the email to the initial intended email address.
  An application of distributive signatures without requiring downloads or installation of signatures.

BRIEF DESCRIPTION OF THE DRAWINGS

The figures presented herein when taken in conjunction with the disclosure form a complete description of the invention, wherein elements and steps indicated by like reference indicators are the same or equivalent elements or steps.

DETAILED DESCRIPTION

Figure 1:
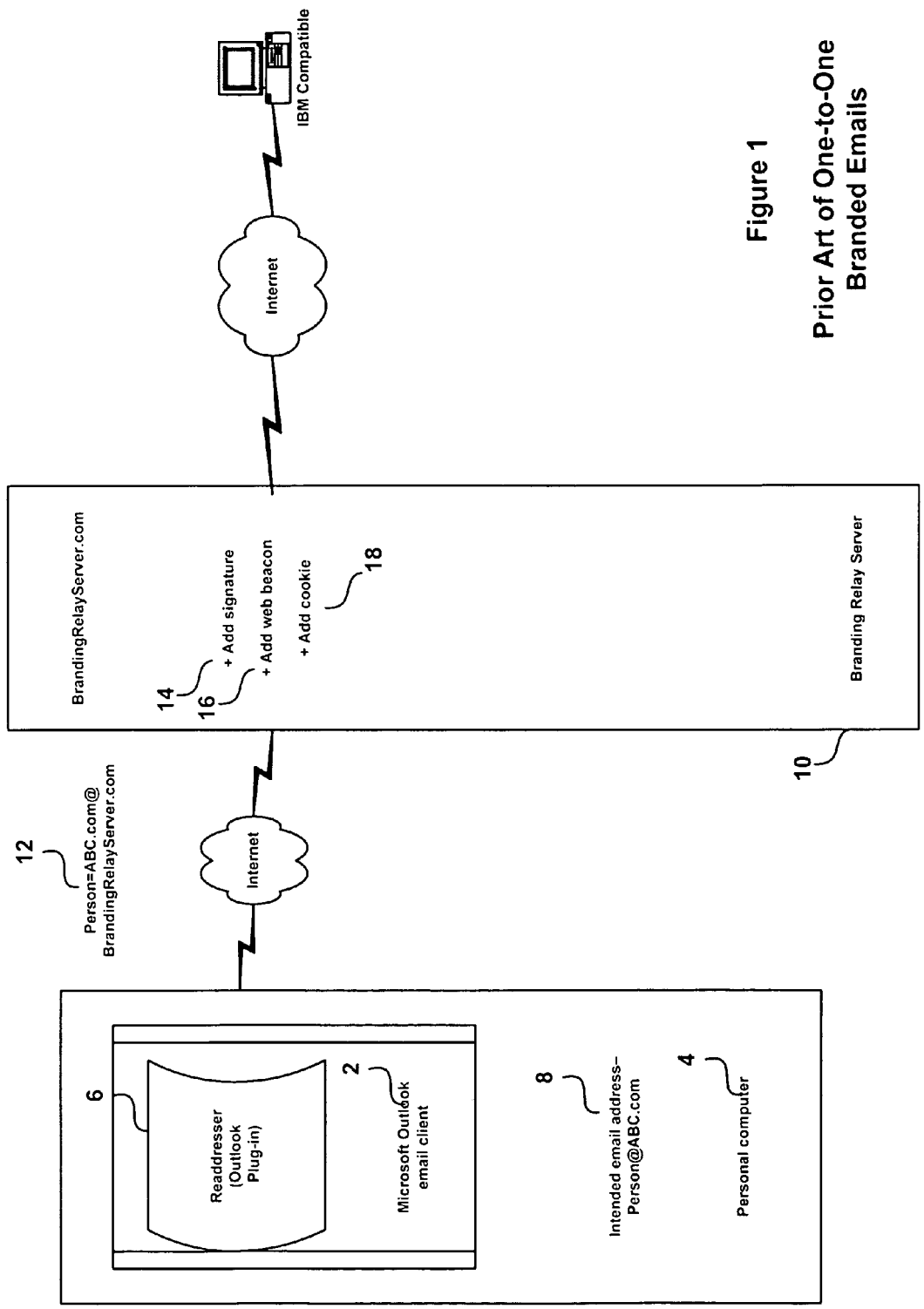
FIG. 1 shows a schematic diagram of prior art of using one-to-one branded emails.
Figure 2:
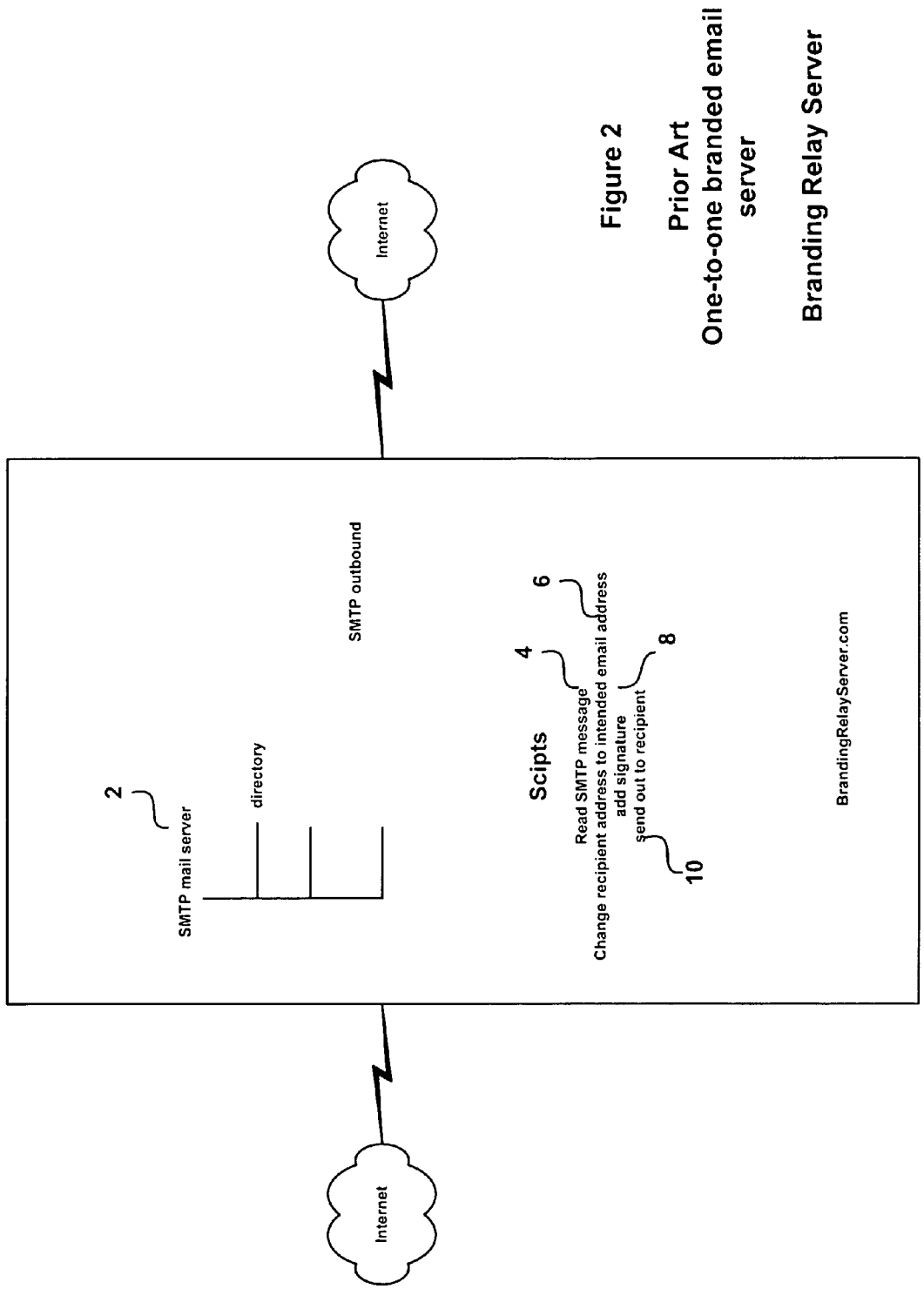
FIG. 2 shows a schematic diagram of prior art of one-to-one branded email server.

Top Level Domain Names and Accompanying Numeric Codes

The Internet uses the Domain Name System (DNS) for email addressing with top level domain names immediately under the root domain name. These top level domain names are names such as "com", "net", "org", . . . . A list of these is made available by Internet Corporation for Assigned Names and Numbers (ICANN). As of today, no top level domain names ends with a number. Such is well known by practitioners of these arts.

Hence, a number immediately behind the top level domain names can carry coded information. For example, ABC.com can be the domain name, with the top level domain name being ".com", and ABC.com1 can be coded to provide different information than ABC.com2, ABC.com3, . . . ABC.comN, where "N" is a number.

"ABC.comN" syntax cannot be used as an email address's domain. However, a readdressed email address can use the "N" to carry more information. For example, an email sent to Person=ABC.com3@BrandRelayServer.com is a valid email address that has a represented intended email address and carries a code "3".

This invention works by adding and using a numeric code in a readdressed email address to specify the HTML signature that the branding relay server will add to the email message. The invention's primary advantage over prior art is the sender can select his signature without having to spend time to web access his branding relay server to select.

One numeric code location could be in front of the represented intended email address, for example 3Person=ABC.com@BrandingRelayServer.com. The problem here is that there are email addresses that begin with a number.

The code can also be inserted into the top level domain name of the represented intended email address, for examples, "3com", "c3om", "co3 m", or "com3". This number "3" can be decoded at the BrandingRelayServer.

Preferred Location of the Numeric Code—Immediately after the Top Level Domain Name The code is preferred immediately to the right of the represented intended email address in the readdressed email address. This is also immediately to the right of the top level domain name of the represented intended email address. This location has a number of ease-of-use benefits. For example, once the intended email address is displayed in email client's pending email's recipient address field (e.g. Outlook's Send "To" field), the sender can easily manually append the numeric code at the end of the intended email address. This can typically be accomplished using a standard keyboard and mouse and then place the cursor anywhere on the intended email address, press the "End" key on the keyboard, and then type a number, for example "3", to form Person@ABC.com3. Forming Person@ABC.3com or Person@ABC.c3om is also possible, but more cumbersome to create and to remember.

Then, a click on a prior art readdresser would change the email address to, for example, a prior art readdress syntax of Person=ABC.com3@BrandingRelayServer.com or, using another prior art readdresser syntax—to Person@ABC.com3.Readnotify.com. The email is then ready to be sent.

The signature code can be placed at other places in the readdressed email address, as a readdressed email addresses' coding can have different formats, symbols, and syntaxes. The general idea is to place a code for signatures in the readdressed email address where the code will not be confused with the represented intended email address, the email can be sent correctly to the BrandingRelayServer, and remain easy for the individual sender to read and understand.

Server Database Setup to Accept the Numeric Code and Add Specified Signature

Figure 6:
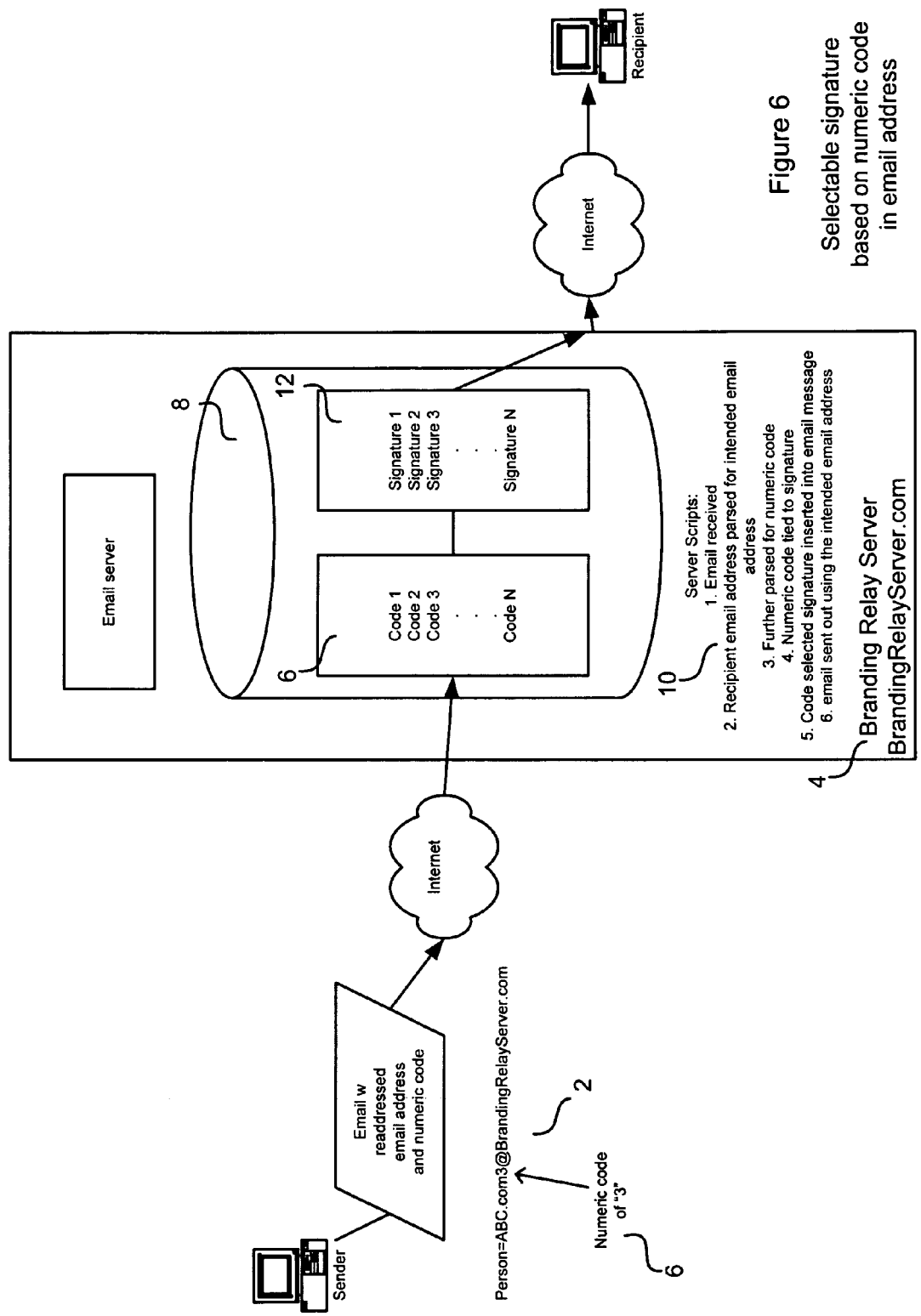
FIGS. 6 shows a schematic diagram of using selectable signature based on numeric code added to email address according to aspects of the invention.

FIG. 6 shows how this invention is created on the server side Much of the technologies used are similar to that explained for prior arts FIGS. 1 through 4. An email message with a readdressed email address is received, its message header or SMTP protocol recipient email address is parsed and modified for the intended email address, the intended email address is reset as the send-to (recipient) email address, a HTML signature is added, and the email forwarded to the intended email address.

The invention's differences begin with that, in FIG. 6, the BrandingRelayServer (4) now receives a readdressed email address Person=ABC.com3@BrandingRelayServer.com (2) that contains a numeric code (6) which specifies a preloaded HTML signature (12) for that email message. FIG. 6 also shows the invention's database (8) that contains HTML signatures (12) associated with the numeric codes (6).

When the mail is received at BrandingRelayServer (4), a series of script actions (10) occur which parse the received readdressed email address (2) for the represented intended email address and the numeric code (6) at the end of the represented intended email address's top level domain name. The script actions (10) then uses the numeric code (6) to then retrieve its associated HTML signature (12) from the database (8), and to insert the signature at a specified location near the end of the email message. Using the known syntax, the represented intended email address is modified to the intended email address, The mail recipient email address and possibly message headers are then reset to the intended email address, and sent out to the intended email address.

Figure 3:
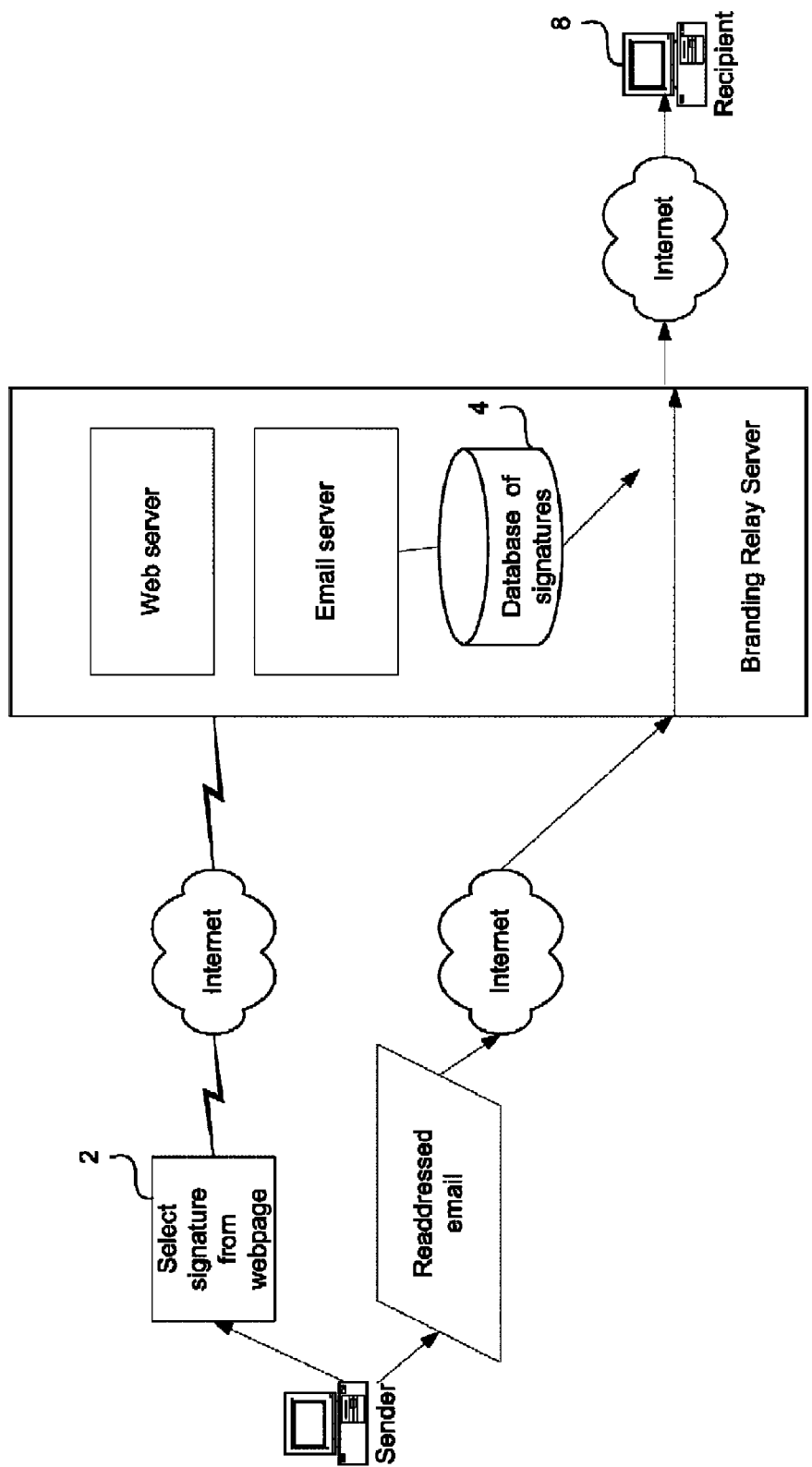
FIG. 3 shows a schematic diagram of prior art of using signature added email.

Unlike FIG. 3's prior art, which requires sender's accessing a web form to change the accompanying signature, FIG. 6 shows that, in using the invention, the sender does not need to spend time to web access BrandingRelayServer to select and insert a different signature.

The preferred embodiment of the server setup is an Intel based microcomputer running Linux and sendmail connected to the Internet. Any number of programming languages can act as the scripting languages. Perl, C, mySQL, PHP, and CGI routines can be used. All these are well known to those in this field.

Additional components of the preferred embodiment are here explained. Sendmail on the server can receive the readdressed email message. SMTP commands in scripts are used to open up the email message. A script action then extracts the readdressed email address from the message headers. The readdressed email address can be parsed and modified for the intended email address and numeric code. A script action then uses the numeric code to select the associated signature from the database. The intended email address is now set as the new recipient email address. A SMTP outbound email software is then used to send the email using the intended email address and with the signature.

Figure 4:
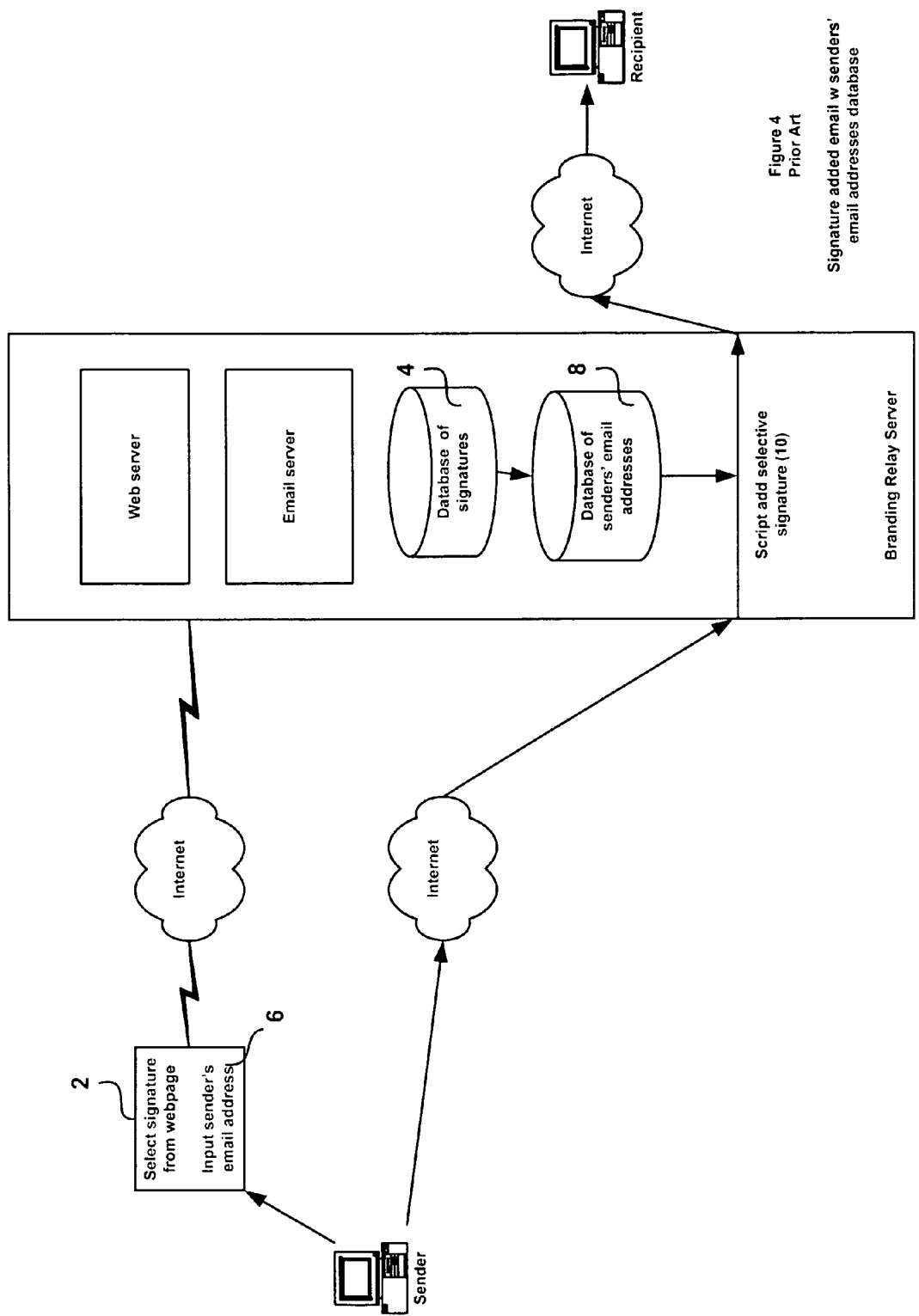
FIG. 4 shows a schematic diagram of prior art of using signature added email with senders' email addresses database.
Figure 7:
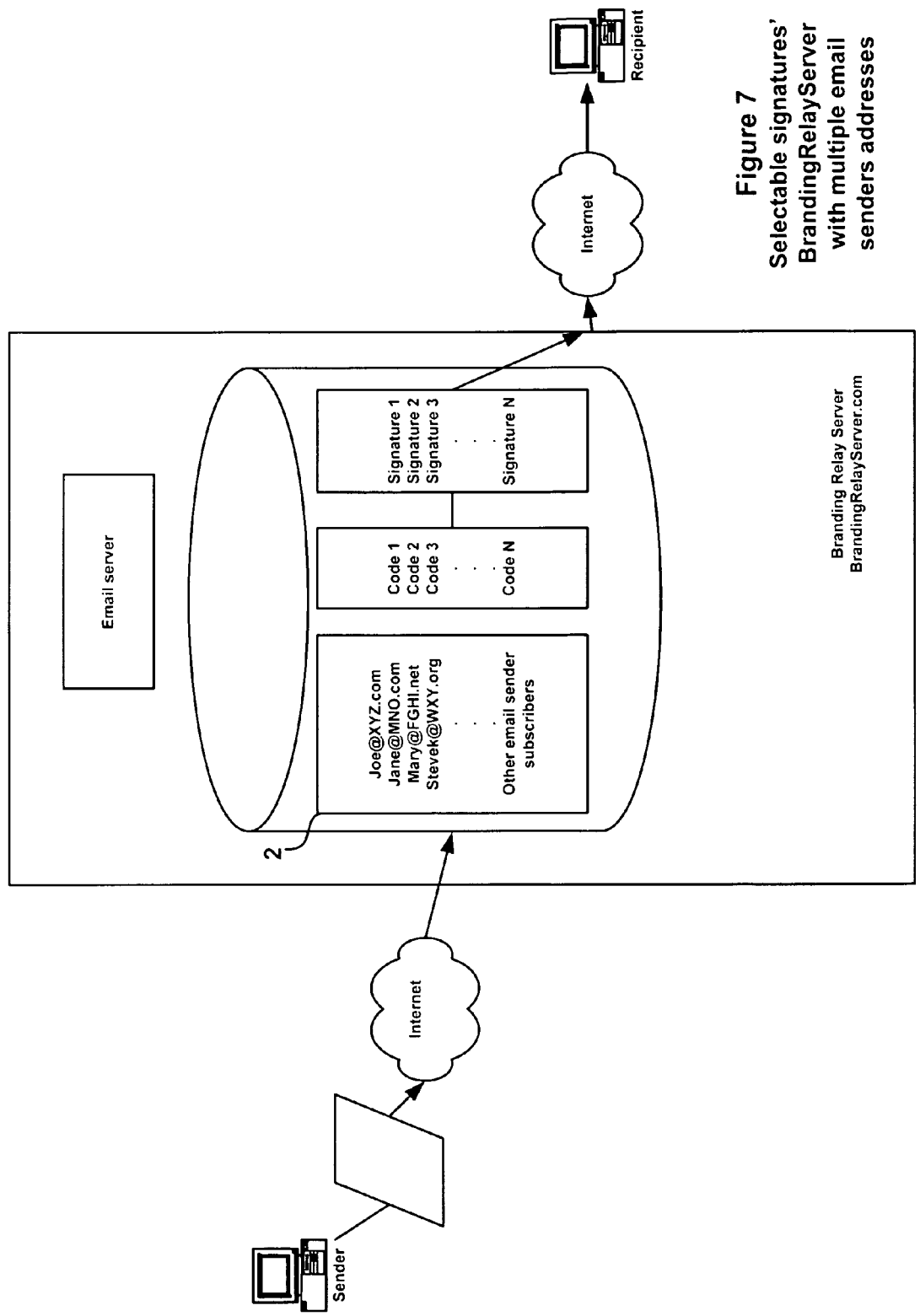
FIGS. 7 shows a schematic diagram of using selectable signatures' BrandingRelayServer with multiple email senders addresses according to aspects of the invention.

FIG. 7 is to FIG. 6 as FIG. 4 is to FIG. 3; analogously, these add senders' email addresses also to the numeric-code-signature database. Most branding relay servers are subscription services that use sender's email address to identify the subscriber. By having the sender's email address also in the database (FIG. 7 #2) (or associated in another database), the BrandingRelayServer can have different HTML signatures for different senders and senders' signature selections. The sender's email address can be extracted in the message header and SMTP protocols. Thereby, each sender can have his own set of signatures to select from, while still sharing a common email server.

Notice that the signature does not need to be HTML; regular text signatures can also be added. Other programming code and content can also be added.

As discussed earlier, prior-art one-to-one branded emails have other techniques for appending and relaying HTML signatures. These use different and possibly custom SMTP email server software packages, with features different from sendmail server. The invention incorporates these prior arts and creates a mechanism where the HTML signature can be changed by appending a numeric code with the intended email address's top level domain name in a one-to-one branded email.

This server setup, without the client enhancement below, is an invention, because the server is now able to use (through readdressing) a numeric code at the end of the intended address's top level domain name to then insert a selected HTML or text signature.

Client Setup

Figure 8:
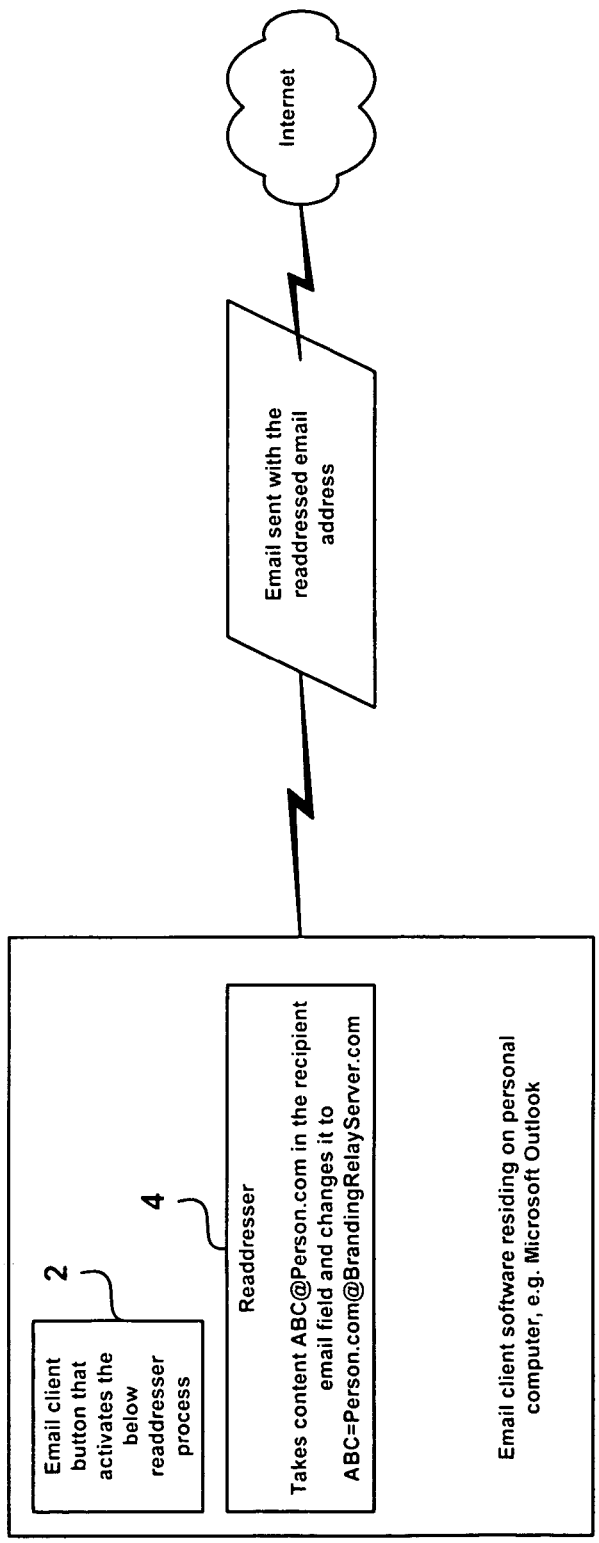
FIG. 8 shows a schematic diagram of prior art of email readdresser.

To send to the BrandingRelayServer, the user can simply type the readdressed address into the email client's recipient email address field. However, as mentioned in the prior arts section, there are email clients readdressers to facilitate this. In most, the readdressers are activated by a sender-click button that launches a process which rewrites the content of the pending email's recipient's email address field to become the readdressed email address. FIG. 8 shows a prior art readdresser.

As stated earlier, such email buttons and programming routines can be written in a number of computing languages that work with associated email clients. Microsoft Outlook, for example, can use Visual Basic for Applications, Outlook Forms, and Visual Basic Scripting Edition (VBScript). Those in one-to-one branded emails and email clients programming are familiar with such techniques.

Figure 9:
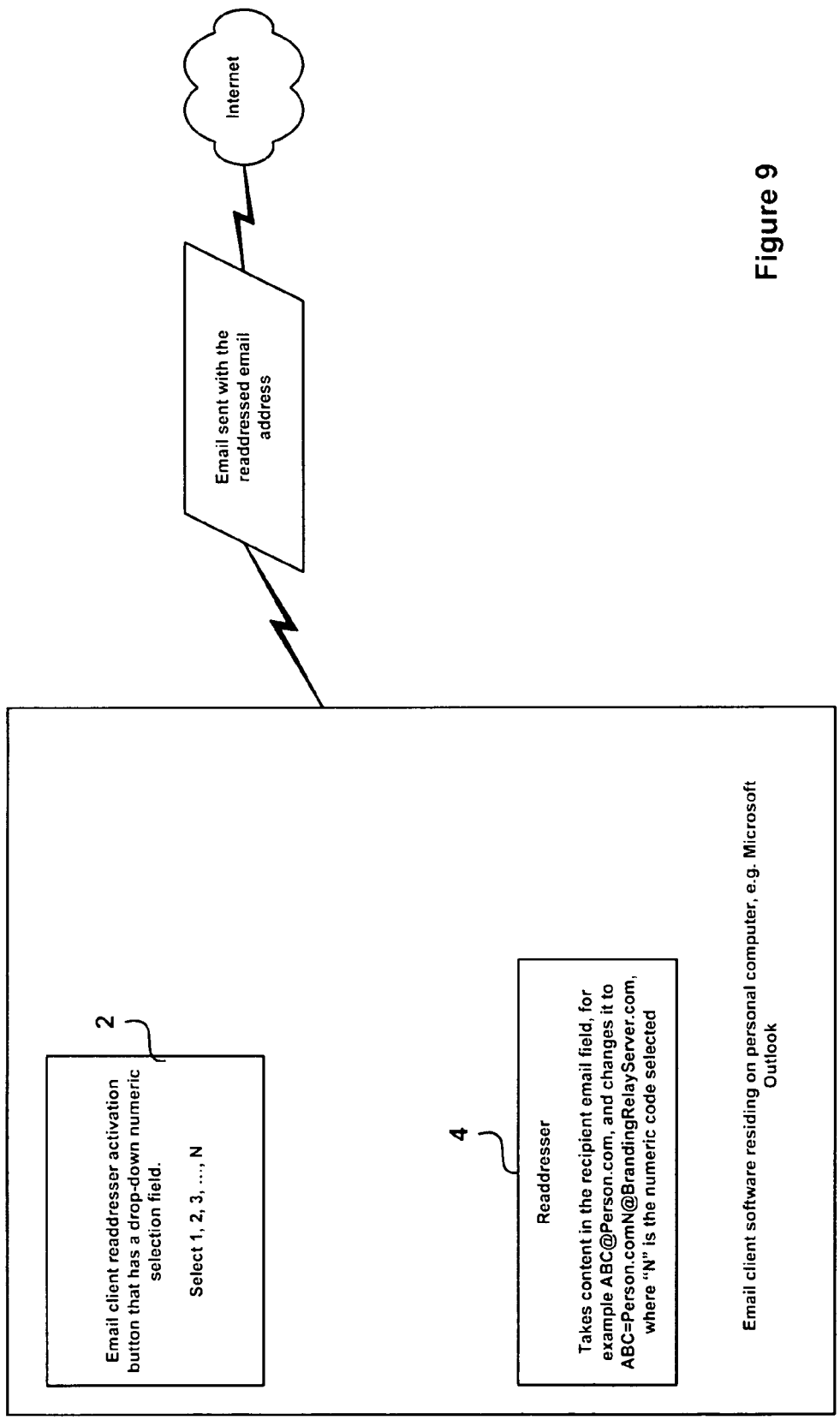
FIGS. 9 shows a schematic diagram of using email readdresser with selectable numeric codes according to aspects of the invention.

FIG. 9 shows that the invention further adds a sender-click numeric code selection button-routine into the email client. This button is preferably a standard prior art drop-down menu button (2) that enables the user to select a number from a series of numbers. Upon clicking the button, this enhanced readdresser now readdresses the intended email address with the selected numeric code appended to the end of the intended email address's top level domain name (4), and continues to create the remaining syntax for the readdressed email. The email now with the readdressed email address can be then automatically sent or wait for a user activated send process.

The numeric code add-on readdressing process is comparable in process to the prior-art readdressing process and uses same computing languages. The difference is that when appending readdressing syntax, an extra selection of a number enables appending also the number into the readdressed address.

This numeric code selection and readdressing process enhances the invention by enabling for an automated routine to add a number to the end of the top level domain name of the intended email address, and allowing for the prior art readdressing process to create the readdressed address, now with the numeric code included. This saves the user from typing time in creating the readdressed email address.

The preferred embodiment of the email client is Microsoft Outlook running on Windows XP operating system running on an Intel Pentium chip based personal computer connected to the Internet. Apple computers, and any other type of computing devices that can run an email client will also work.

New Distributive Email Signatures without Requiring Software Installation.

Figure 5:
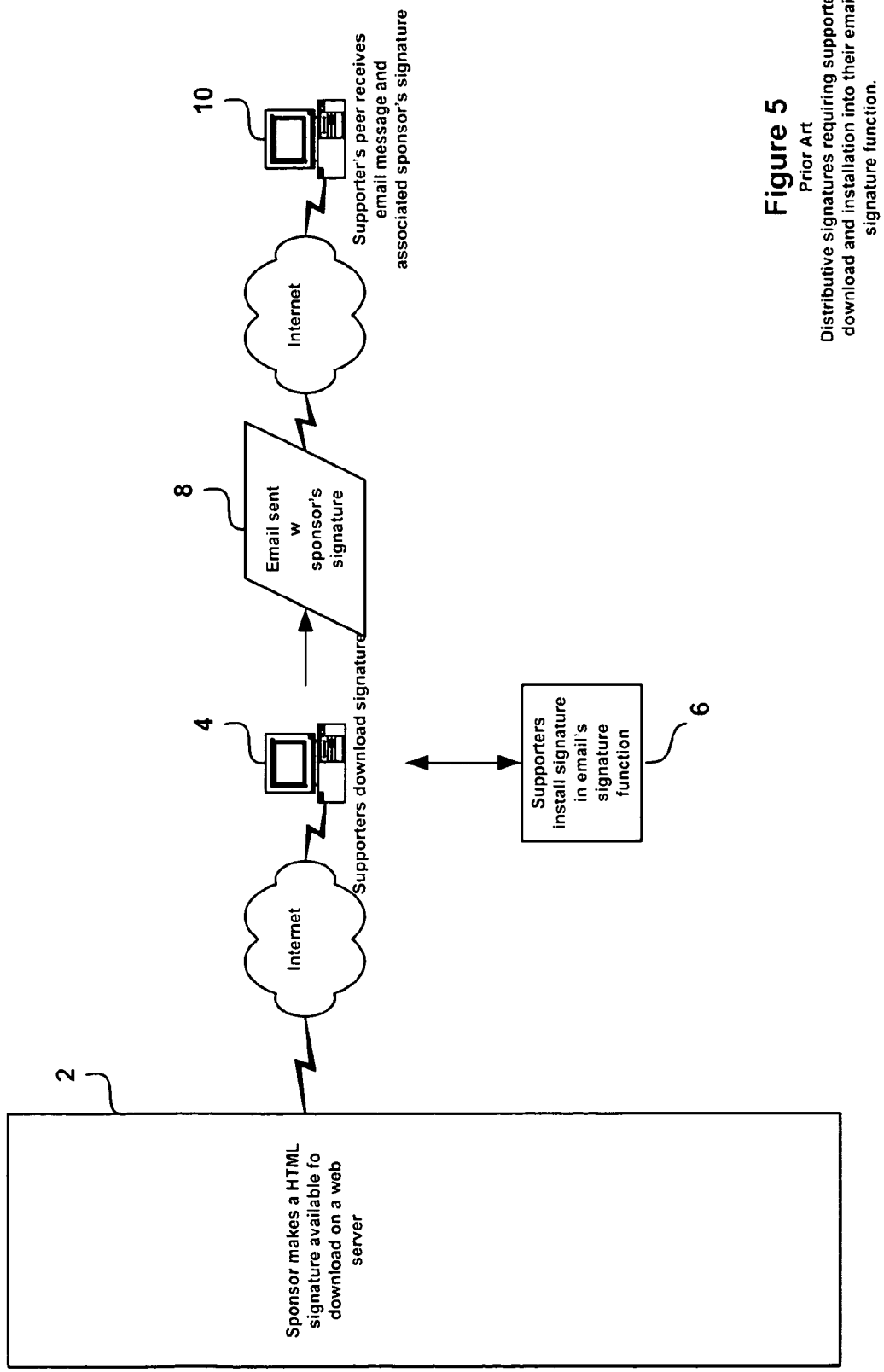
FIG. 5 shows a schematic diagram of prior art of using distributive signatures requiring supporters' download and installation into their email's signature function.

The difficulty and challenge of mass-adoption of the prior art of sponsor-distributive email signatures, described by FIG. 5, was motivating the supporters to install the HTML email signature into their email client's signature function. Their reluctance was due to fear of installing viruses, malware, spyware, and others. Additionally, many email clients have faulty HTML editing, and once the HTML signature was added to the email message, it was often difficult to edit emails. Dictionaries would not run, formatting would be improper, changes wouldn't hold.

Using this invention's readdressed email address, the supporter now doesn't have to install a HTML signature or anything on his computer. The supporter can simply type his email message as normally, and when he desires to send a specific sponsor endorsement signature, type in the readdressed email address, with the numeric code.

Figure 10:
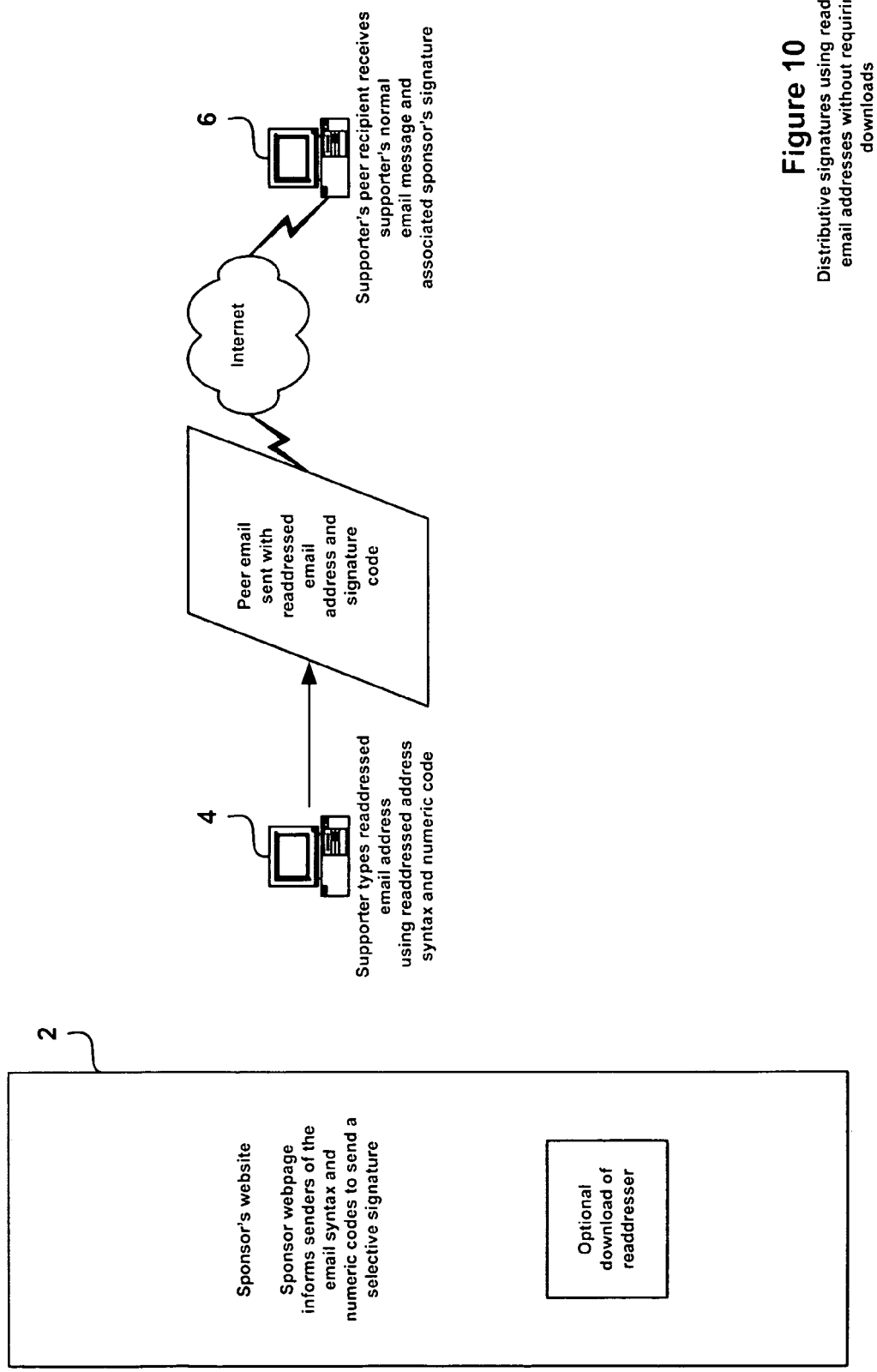
FIGS. 10 shows a schematic diagram of using selectable signatures having numeric codes added to email address for distributive signatures according to aspects of the invention.

FIG. 10 is an example of distributive signature using selective signatures. For example, suppose the candidate and sponsor is fictitious President Vush using PresidentVush.com for his email domain, and he sponsors two signatures using this invention. The instructions for using these signatures are offered on the website www.PresidentVush.com (2). Signature #1 is red, white, and blue, has an American flag click link graphics, and states the message "I support President Vush's domestic policies." #2 is green and brown, has a military tank click link graphics, and states the message "I support President Vush's foreign policies".

The supporter can type (4) Person=ABC.com2@PresidentVush.com, to send signature #2 along with his message; or type Person=ABC.com1@PresidentVush.com to send signature #1. Because the supporter is usually sending a peer-to-peer email where he knows the recipient, the supporter can select the signature to best influence his peer. These type of endorsements greatly save influence time in American democratic process. The supporter is able to persuade without spending much time, and he is able to target persuade, based on his knowledge of the recipient.

The recipient can easily choose to find out more about the signature, by click-linking the signature for more details. For example, if the recipient receives signature #2 (6), and is shocked the sender-friend sent him a military tank graphics, the recipient may click link on the military tank graphics to arrive at a webpage that explains why the military option is best. As this webpage persuasion is endorsed by his peer-sender-friend, the recipient is more easily persuaded. Enabling this sender-endorsement-via-email to occur will be valuable to the democratic process, which in its founding ideals, relies on peer persuasion rather than current mass media persuasion.

FIG. 10 shows that with the invention the sender does not have to download or install anything in order to select and change endorsement signatures.

The example above is a political sponsor, but other applications are also suitable. These can include: commercially sponsored signatures ("I Love My Harley Davidson Motorcycle", with selectable motorcycle graphics), non-profit sponsored signatures ("Contribute to the Red Cross", with selectable contribution causes message), and social sponsored signatures ("I Love New York", with selectable New York images and text).

Notice that the signature can be graphically appealing HTML or simply regular text or other programming code and content. Using coded signature this way facilitates peer-to-peer signature endorsements because the sender doesn't have to download and install anything.

SUMMARY

In summary, these detailed specifications formed an invention comprising of a readdressed recipient email address containing a numeric code, a branding relay server that recognizes this code to insert a selected email signature, a email client readdresser that creates a numeric coded readdressed email address, and an application in sponsor distributive signature without requiring software installation.

While the disclosure contained herein has set forth several embodiments of the invention, and many of the fundamental components used within the invention are well known within the art, it will be appreciated by those skilled in the art that variations to the combination of elements and steps disclosed can be made without departing from the scope and spirit of the invention.

I claim:

1. A method of sending an enhanced email comprising:
providing an email with an intended email address;
modifying the intended email address into a readdressed email address in the email by:
   adding a signature selection code to a top level domain name of the intended email address to create an interim email address with an invalid top level domain name; and
   separately from adding said signature selection code, modifying the interim email address for email readdressing comprising appending a server domain name preceded by a period to the interim email address,
   wherein the readdressed email address comprises the intended email address, the signature selection code, the period, and the server domain name, wherein the server domain name is at an end of the readdressed email address;
providing an Internet connected server having said server domain name for receiving said email based on said readdressed email address and sending said enhanced email based on said intended email address;
providing, on said server, a database associating said signature selection code with corresponding add-on programming code;
receiving said email at said server based on said readdressed email address;
extracting, at said server, said signature selection code and said intended email address from said email;
inserting into said email, at said server, the add-on programming code corresponding to said signature selection code to create said enhanced email; and
sending, from said server, said enhanced email based on said intended email address, whereby a sender of said email can specify said add-on programming code to insert through said signature selection code comprised in said readdressed email address and thus selectively creates said enhanced email for sending to a recipient of said email.

2. The method of claim 1 wherein said signature selection code is numeric.

3. The method of claim 1 wherein said add-on programming code is a Hyper Text Markup Language (HTML) code, when executed by a processor of a computer system, displays a pre-determined image.

4. The method of claim 1 wherein said add-on programming code is text.

5. A method of using a readdressed email address with a selectable signature code to enable a supporter of a sponsor to send an enhanced email with a sponsor-generated email signature to a peer of the supporter, comprising:
providing, to the supporter, a syntax description of said readdressed email address that comprises an intended email address, a signature selection code, a period, and a server domain name, wherein the server domain name is at an end of said readdressed email address;
generating, by the supporter based on the syntax description, an email comprising said readdressed email address using an email address of the peer as said intended email address, comprising:
   adding said signature selection code to a top level domain name of said intended email address to create an interim email address with an invalid top level domain name; and
   separately from adding said signature selection code, modifying the interim email address for email readdressing comprising appending the server domain name preceded by the period to the interim email address;
providing an Internet connected server having said server domain name for receiving said email based on said readdressed email address and sending said enhanced email based on said intended email address;
providing on said server a database associating said signature selection code with corresponding add-on programming code, when executed by a processor of a computer system, displaying the sponsor-generated email signature to promote a cause of the sponsor;
receiving said email at said server based on said readdressed email address,
extracting, at said server, said signature selection code and said intended email address from said email;
inserting into said email, at said server, the add-on programming code corresponding to said signature selection code to create said enhanced email; and
sending, from said server, said enhanced email based on said intended email address, whereby the supporter can selectively include the sponsor-generated signature to create said enhanced email from said email for sending to the peer without having to install any additional software by the supporter.

6. The method of claim 5 wherein said signature selection code is numeric.

7. The method of claim 5 wherein the said add-on programming code, when executed by a processor of a computer system, causes displaying of political messages.

8. The method of claim 5 wherein the said add-on programming code, when executed by a processor of a computer system, causes displaying of commercial messages.

9. A method for sending email signatures comprising:
providing an email with a readdressed email address that contains a signature selection code and information for recreating an intended email address from the readdressed email address, wherein said intended email address is modified into the readdressed email address by:
   adding said signature selection code to a top level domain name of said intended email address to create an interim email address with an invalid top level domain name; and
   separately from adding said signature selection code, modifying the interim email address for email readdressing comprising appending a server domain name preceded by a period to the interim email address,
   wherein the readdressed email address comprises the intended email address, the signature selection code, the period, and the server domain name, wherein the server domain name is at an end of the readdressed email address;
providing an Internet connected server having said server domain name for receiving said email based on the readdressed email address, inserting selection-code assigned programming code into said email to create an enhanced email, and forward said enhanced email to the intended email address;

receiving said enhanced email based on the intended email address and displaying a pre-determined signature image by executing the programming code using a processor, whereby, the sender can send the readdressed email with the signature selection code for displaying the pre-determined signature image to a recipient of said email.

10. The method of claim 9 wherein the said programming code is a Hyper Text Markup Language (HTML) code.

11. The method of claim 9 wherein the said programming code is text.

12. The method of claim 1 wherein said signature selection code is located immediately after a top level domain name of said intended email address.

13. The method of claim 1, wherein said signature selection code and said intended email address are extracted from a message header of said email.

14. The method of claim 13, further comprising:
resetting, in said enhanced email, the message header of said email to said intended email address.

15. The method of claim 1, further comprising:
extracting a sender's email address from a message header of said email,
wherein the add-on programming code is further associated with said sender's email address in said database.

16. The method of claim 1, further comprising:
providing a sender-activated code selection process in an email client for providing said email,
wherein said signature selection code is provided using said sender-activated code selection process.

17. The method of claim 16, wherein said signature selection code is numeric.

18. The method of claim 16, wherein said sender-activated code selection process comprises a sender-click button.

19. The method of claim 5 wherein said signature selection code is located immediately after a top level domain name of said intended email address.

20. The method of claim 5, wherein said signature selection code and said intended email address are extracted from a message header of said email.

21. The method of claim 20, further comprising:
resetting, in said enhanced email, said message header of said email to said intended email address.

22. The method of claim 5, further comprising:
extracting a sender's email address from a message header of said email,
wherein said add-on programming code is further associated with said sender's email address in said database.

23. The method of claim 5, further comprising:
providing a sender-activated code selection process in an email client for providing said email,
wherein said signature selection code is provided using said sender-activated code selection process.

24. The method of claim 23, wherein said signature selection code is numeric.

25. The method of claim 23, wherein said sender-activated code selection process comprises a sender-click button.

26. A method of sending an enhanced email by readdressing an intended email address using a signature selection code, comprising:
providing an email client comprising a signature selection code selector and an email address readdresser;
generating an email comprising said intended email address using said email client;
selecting, within said email client, said signature selection code using said signature selection code selector;
generating, within said email client, a readdressed email address using said email address readdresser based on said signature selection code and said intended email address, comprising:
adding said signature selection code to a top level domain name of said intended email address to create an interim email address with an invalid top level domain name; and
separately from adding said signature selection code, modifying the interim email address for email readdressing comprising appending a server domain name preceded by a period to the interim email address,
wherein the readdressed email address comprises the intended email address, the signature selection code, the period, and the server domain name, wherein the server domain name is at an end of the readdressed email address;
sending said email based on said readdressed email address to a server having said server domain name; and
generating said enhanced email from said email using said server.

27. The method of claim 26, further comprising:
sending, from said server, said enhanced email based on said intended email address.

28. The method of claim 27, further comprising:
providing, on said server, a database associating said signature selection code with corresponding add-on programming code;
receiving said email at said server based on said readdressed email address;
extracting, at said server, said signature selection code and said intended email address from said email; and
inserting into said email, at said server, the add-on programming code corresponding to said signature selection code to create said enhanced email.

29. A device for sending an enhanced email by readdressing an intended email address and adding a signature selection code, comprising:
an email client comprising;
a signature selection code selector configured to select, based on user input, said signature selection code from a menus and
an email address readdresser configured to generate a readdressed email address by adding said signature selection code to a top level domain name of the intended email address to create an interim email address with an invalid top level domain name; and
separately from adding said signature selection code, modifying the interim email address for email readdressing comprising appending a server domain name preceded by a period to the interim email address,
wherein the readdressed email address comprises the intended email address, the signature selection code, the period, and the server domain name, wherein the server domain name is at an end of the readdressed email address;
a processor and memory storing instructions when executed by the processor comprising functionalities for:
receiving said user input for said email client; and
causing said email client to send email based on said readdressed email address to a server having said server domain name for generating said enhanced email.

30. A system for sending an enhanced email by readdressing an intended email address and adding a signature selection code, comprising:

a user device comprising:
- an email client comprising a signature selection code selector configured to select, based on user input, said signature selection code from a menu and an email address readdresser configured to generate a readdressed email address by adding said signature selection code to a top level domain name of the intended email address to create an interim email address with an invalid top level domain name, and
- separately from adding said signature selection code, modifying the interim email address for email readdressing comprising appending a server domain name preceded by a period to the interim email address,
- wherein the readdressed email address comprises the intended email address, the signature selection code, the period, and the server domain name, wherein the server domain name is at an end of the readdressed email address, and
- a processor and memory storing instructions when executed by the processor comprising functionalities for:
  - receiving said first user input for said email client;
  - causing said email client to send email based on said readdressed email address to a server having said server domain name; and
- said server configured to:
  - receive said email based on said readdressed email address,
  - create said enhanced email from said email based on said signature selection code, and
  - send said enhanced email based on said intended email address.

* * * * *

UNITED STATES PATENT AND TRADEMARK OFFICE
CERTIFICATE OF CORRECTION

| | | |
|---|---|---|
| PATENT NO. | : 7,882,186 B1 | Page 1 of 1 |
| APPLICATION NO. | : 11/546740 | |
| DATED | : February 1, 2011 | |
| INVENTOR(S) | : Chen Sun | |

It is certified that error appears in the above-identified patent and that said Letters Patent is hereby corrected as shown below:

In Claim 29, Column 14 (line 39), the ";" at the end should be a ":".

In Claim 29, Column 14 (line 42), "menus" should read --menu;--.

In Claim 29, Column 14 (line 61), add --said-- after "send".

In Claim 30, Column 16 (line 6), add --and-- before "causing".

In Claim 30, Column 16 (line 6), add --said-- after "send".

Signed and Sealed this
Twelfth Day of April, 2011

David J. Kappos
*Director of the United States Patent and Trademark Office*